(12) United States Patent
Allen et al.

(10) Patent No.: US 7,542,042 B1
(45) Date of Patent: Jun. 2, 2009

(54) SUBPICTURE OVERLAY USING FRAGMENT SHADER

(75) Inventors: Roger L. Allen, San Jose, CA (US); Rui M. Bastos, Porto Alegre (BR); Karim M. Abdalla, Menlo Park, CA (US); Justin S. Legakis, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 390 days.

(21) Appl. No.: 10/985,575

(22) Filed: Nov. 10, 2004

(51) Int. Cl.
*G06T 1/20* (2006.01)
*G06F 15/80* (2006.01)
*G09G 5/377* (2006.01)
G09G 5/397 (2006.01)
G09G 5/00 (2006.01)

(52) U.S. Cl. .................... 345/506; 345/505; 345/629
(58) Field of Classification Search ................. 345/629, 345/501, 506, 522, 505
See application file for complete search history.

(56) References Cited

U.S. PATENT DOCUMENTS

| | | | | |
|---|---|---|---|---|
| 5,313,566 A | * | 5/1994 | Hedley et al. | 345/419 |
| 5,732,230 A | * | 3/1998 | Cullen et al. | 715/764 |
| 5,821,950 A | * | 10/1998 | Rentschler et al. | 345/505 |
| 5,867,166 A | * | 2/1999 | Myhrvold et al. | 345/419 |
| 5,926,644 A | * | 7/1999 | Hays | 712/22 |
| 5,963,215 A | * | 10/1999 | Rosenzweig | 345/649 |
| 6,179,489 B1 | * | 1/2001 | So et al. | 718/102 |
| 6,266,068 B1 | * | 7/2001 | Kang et al. | 345/629 |
| 6,344,853 B1 | * | 2/2002 | Knight | 345/629 |
| 6,369,830 B1 | * | 4/2002 | Brunner et al. | 345/629 |
| 6,411,742 B1 | * | 6/2002 | Peterson | 382/284 |
| 6,563,505 B1 | * | 5/2003 | Mills et al. | 345/522 |
| 6,573,905 B1 | * | 6/2003 | MacInnis et al. | 345/629 |
| 6,636,222 B1 | * | 10/2003 | Valmiki et al. | 345/505 |
| 6,636,647 B1 | * | 10/2003 | Ohki et al. | 382/284 |
| 6,674,484 B1 | * | 1/2004 | Boland et al. | 348/580 |
| 6,693,719 B1 | * | 2/2004 | Gupta et al. | 358/1.15 |
| 6,704,026 B2 | * | 3/2004 | Kurihara et al. | 345/629 |
| 6,753,878 B1 | * | 6/2004 | Heirich et al. | 345/629 |
| 6,762,764 B2 | * | 7/2004 | Hiwada et al. | 345/506 |
| 6,801,203 B1 | * | 10/2004 | Hussain | 345/506 |
| 6,833,831 B2 | * | 12/2004 | Emberling et al. | 345/506 |
| 6,897,871 B1 | * | 5/2005 | Morein et al. | 345/501 |
| 6,924,807 B2 | * | 8/2005 | Ebihara et al. | 345/503 |

(Continued)

OTHER PUBLICATIONS

Chambers, Mike, "NVIDIA GeForce3 Preview", http://www.nvnews.net/previews/geforce3/multitexturing.shtml, Jul. 18, 2001.*

(Continued)

*Primary Examiner*—Ulka Chauhan
*Assistant Examiner*—Roberta Prendergast
(74) *Attorney, Agent, or Firm*—Patterson & Sheridan LLP

(57) ABSTRACT

A new method of operating a fragment shader to produce complex video content comprised of a video image or images, such as from a DVD player, that overlays a fragment shader-processed background. Pixels are fragment shader-processed during one loop or set of loops through a texture processing stations to produce a fragment shader-processed background. Then, at least some of those pixels are merged with the video or images to produce complex video content. The resulting complex image is then made available for further processing.

14 Claims, 7 Drawing Sheets

U.S. PATENT DOCUMENTS

| | | | | |
|---|---|---|---|---|
| 6,925,520 | B2* | 8/2005 | Ma et al. | 710/317 |
| 6,940,512 | B2* | 9/2005 | Yamaguchi et al. | 345/505 |
| 7,075,542 | B1* | 7/2006 | Leather | 345/506 |
| 7,095,423 | B2* | 8/2006 | Cosman et al. | 345/629 |
| 7,206,029 | B2* | 4/2007 | Cohen-Solal | 348/565 |
| 7,385,607 | B2* | 6/2008 | Bastos et al. | 345/502 |
| 7,439,979 | B1* | 10/2008 | Allen et al. | 345/506 |
| 2002/0087832 | A1* | 7/2002 | Jarvis et al. | 712/206 |
| 2002/0093516 | A1* | 7/2002 | Brunner et al. | 345/629 |
| 2003/0164830 | A1* | 9/2003 | Kent | 345/505 |
| 2004/0012563 | A1* | 1/2004 | Papakipos et al. | 345/157 |
| 2004/0041820 | A1* | 3/2004 | Sevigny | 345/619 |
| 2004/0042654 | A1* | 3/2004 | Sevigny | 382/167 |
| 2004/0051716 | A1* | 3/2004 | Sevigny | 345/589 |
| 2004/0174912 | A1* | 9/2004 | Moon | 370/542 |
| 2004/0223003 | A1* | 11/2004 | Heirich et al. | 345/629 |
| 2005/0225554 | A1* | 10/2005 | Bastos et al. | 345/506 |

OTHER PUBLICATIONS

NVIDIA, "The Infinite Effects GPU", http://www.nvidia.com/object/LO_20010612_4376.html, 2001.*

Olano et al., "A shading language on graphics hardware: the pixelflow shading system", Proceedings of the 25th Annual Conference on Computer Graphics and interactive Techniques, SIGGRAPH '98, ACM, New York, NY, pp. 159-168.*

Molnar et al., "PixelFlow: high-speed rendering using image composition", Proceedings of the 19th Annual Conference on Computer Graphics and interactive Techniques, ACM SIGGRAPH Computer Graphics, v.26 n.2, p. 231-240, Jul. 1992.*

Akeley, K., 1993, "Reality Engine graphics" Proceedings of the 20th Annual Conference on Computer Graphics and interactive Techniques SIGGRAPH '93, ACM, New York, NY, pp. 109-116.*

Eldridge et al., "Pomegranate: a fully scalable graphics architecture", Proceedings of the 27th annual conference on Computer graphics and interactive techniques, pp. 443-454, Jul. 2000.*

Eyles et al., "PixelFlow: the realization", Proceedings of the ACM SIGGRAPH/EUROGRAPHICS Workshop on Graphics Hardware, Aug. 3-4, 1997, HWWS '97, ACM, New York, NY, pp. 57-68.*

Fuchs et al., "Pixel-planes 5: a heterogeneous multiprocessor graphics system using processor-enhanced memories", Proceedings of the 16th annual conference on Computer graphics and interactive techniques, p. 79-88, Jul. 1989.*

Humphreys et al., "WireGL: a scalable graphics system for clusters", Proceedings of the 28th annual conference on Computer graphics and interactive techniques, pp. 129-140, Aug. 2001.*

Lastra, et al., 1995, "Real-time programmable shading", Proceedings of the 1995 Symposium on interactive 3D Graphics, Apr. 9-12, 1995, SI3D '95, ACM, New York, NY, pp. 59-66, 207.*

Mark, W. R., et al., "Compiling to a VLIW fragment pipeline", Proceedings of the ACM SIGGRAPH/EUROGRAPHICS Workshop on Graphics Hardware, HWWS '01, 2001, ACM Press, New York, NY, pp. 47-56.*

Porter, T. and Duff, T., 1984, "Compositing digital images", SIGGRAPH Computer Graphics, vol. 18, Issue 3, Jul. 1984, pp. 253-259.*

Kapasi, U. J., Rixner, S., Dally, W. J., Khailany, B., Ahn, J. H., Mattson, P., and Owens, J. D., 2003, "Programmable Stream Processors", Computer archive, vol. 36, Issue 8, Aug. 2003, pp. 54-62.*

ATI, Radeon X800 3D Architecture White Paper, Apr. 2004.*

Chung, C.Y.; Managuli, R.A.; Yongmin Kim, "Design and evaluation of a multimedia computing architecture based on a 3D graphics pipeline," Proceedings of the IEEE International Conference on Application-Specific Systems, Architectures and Processors, 2002, pp. 243-252.*

William J. Dally, Francois Labonte, Abhishek Das, Patrick Hanrahan, Jung-Ho Ahn, Jayanth Gummaraju, Mattan Erez, Nuwan Jayasena, Ian Buck, Timothy J. Knight, Ujval J. Kapasi, Merrimac: Supercomputing with Streams, Proceedings of the 2003 ACM/IEEE conference on Supercomputing, p. 35, Nov. 15-21, 2003.*

Dally, W. J., Kapasi, U. J., Khailany, B., Ahn, J. H., and Das, A., 2004, "Stream Processors: Programmability and Efficiency", Queue archive, vol. 2, Issue 1 (Mar. 2004), ACM, pp. 52-62.*

L. Darsa, S. Stadnicki, and C. Basoglu, "MAP3D—a media processor approach for high-end 3D graphics," SPIE Proceedings, vol. 3970, pp. 100-107, 2000.*

Deering, M. and Naegle, D., 2002, "The SAGE graphics architecture", Proceedings of the 29th Annual Conference on Computer Graphics and interactive Techniques, Jul. 23-26, 2002, SIGGRAPH '02, ACM, New York, NY, pp. 683-692.*

Dutta, S., "Architecture, Design, and Verification of an 18 Million Transistor Digital Television and Media Processor Chip", Proceedings of the 10th international Workshop on integrated Circuit Design, Power and Timing Modeling, Optimization and Simulation, Sep. 13-15, 2000, D. Soudris, P. Prisch, and E. Barke, Eds., Lecture Notes In Computer.*

Dutta, S., "Architecture and design of NX-2700: a programmable single-chip HDTV all-format-decode-and-display processor," IEEE Transactions on Very Large Scale Integration (VLSI) Systems, vol. 9, No. 2, pp. 313-328, Apr. 2001.*

Gass, W.K., "System integration issues for set-top box," 1997 IEEE Workshop on Signal Processing Systems, 1997, SIPS 97—Design and Implementation, pp. 65-75, Nov. 3-5, 1997.*

Kapasi, U. J., Rixner, S., Dally, W. J., Khailany, B., Ahn, J. H., Mattson, P., and Owens, J. D., 2003, "Programmable Stream Processors", Computer archive, vol. 36, Issue 8, Aug. 2003, pp. 54-62.*

Kapasi, Ujval J., "Conditional techniques for stream processing kernels", Ph.D., Stanford University, 2004, 155 pages.*

Khailany, Brucek Kurdo, "The VLSI implementation and evaluation of area- and energy-efficient streaming media processors", Ph.D., Stanford University, 2003, 152 pages.*

Kowalczyk, et al., "The first MAJC microprocessor: a dual CPU system-on-a-chip," IEEE Journal of Solid-State Circuits, vol. 36, No. 11, pp. 1609-1616, Nov. 2001.*

Owens, J. D., Dally, W. J., Kapasi, U. J., Rixner, S., Mattson, P., and Mowery, B. 2000, "Polygon rendering on a stream architecture", Proceedings of the ACM SIGGRAPH/EUROGRAPHICS Workshop on Graphics Hardware, Aug. 21-22, 2000, S. N. Spencer, Ed. HWWS '00. ACM, New York, NY, pp. 23-32.*

Owens, et al., "Comparing Reyes and OpenGL on a stream architecture", Proceedings of the ACM SIGGRAPH/EUROGRAPHICS Conference on Graphics Hardware, Sep. 1-2, 2002, Eurographics Association, pp. 47-56.*

Owens, John Douglas, "Computer graphics on a stream architecture", Ph.D., Stanford University, 2003, 161 pages.*

Tremblay, et al., 2000, "The MAJC Architecture: A Synthesis of Parallelism and Scalability", IEEE Micro archive, vol. 20, Issue 6, Nov. 2000, pp. 12-25.*

Mei Wen, et al., "Multiple-dimension Scalable Adaptive Stream Architecture", Proc. of Ninth Asia-pacific Computer System Architecture Conference, Springer's LNCS 3189, 2004, pp. 199-211.*

* cited by examiner

SUBPICTURE OVERLAY USING FRAGMENT SHADER

BACKGROUND OF THE INVENTION

1. Field of the Invention

The present invention relates to computer graphic systems, and more particularly to computer graphic systems that display overlapping images using fragment shaders.

2. Description of the Related Art

Graphics processing is an important feature of modern high-performance computing systems. In graphic processing mathematical procedures are implemented to render, or draw, graphic primitives, e.g., a triangle or a rectangle, on a display to produce desired visual effects. Real time graphics processing is based on the high-speed processing of graphic primitives to produce visually pleasing moving images.

Some computer systems have the ability to display television signals and video images such as those produced by DVD players. Graphics processing and displaying video images are to some extent distinct capabilities. This is because most video images are not graphically processed but are produced in a manner that is very similar to that used in television sets (raster scanning of video signals). However, computer graphic display systems have architectures that are very different from that used in television.

FIG. 1 illustrates a simplified block diagram of a computer graphics system 100. As shown, a graphics processing unit 102 has a host interface/front end 104. The host interface/front end 104 receives raw graphics data from a central processing unit 103 that is running an application program stored in memory 105. The host interface/front end 104 buffers input information and supplies that information to a geometry engine 106. The geometry engine has access to a frame buffer memory 120 via a frame buffer interface 116.

The geometry engine 106 produces, scales, rotates, and projects three-dimensional vertices of graphics primitives in "model" coordinates that are stored in the frame buffer memory 120 into two-dimensional frame-buffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a fragment shader 110 that processes input data (code, position, texture, conditions, constants, etc) using a fragment shader program (sequence of instructions) to generate output data. While fragment shaders are described in relation to their applications in graphics processing, fragment shaders are, in general, useful for other functions. Fragment shaders can be considered as a collection of processing capabilities that can handle large amounts of data at the same time, such as by parallel handling of data.

The fragment shader 110 includes a texture engine 112 that modifies the rasterized pixel data to have desired texture and optical features. The texture engine 112, which has access to the data stored in the frame buffer memory 120 via the frame buffer interface 116, can be implemented using a hardware pipeline comprised of one or more texture processing stations that process large amounts of data at very high speed. The processed pixel data is sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used to produce images on a display 122.

Computer graphic systems such as that shown in FIG. 1 can be made programmable. In such designs, one processing station can be programmed to perform one set of operations, another processing station can be programmed to perform another set of operations, and so on. Such functionality has proven itself to be highly advantageous from an implementation perspective and highly desirable from a user perspective.

While computer graphic systems have proven themselves to be useful, new methods of operating them are being developed. Given that video signals, such as from a DVD player or a television program are usually processed as in televisions, a method of using a computer graphic system to produce complex video content by blending multiple images, including DVD and other video signals, would be beneficial.

SUMMARY OF THE INVENTION

The principles of the present invention provide for a new method of operating computer graphic system having fragment shaders to produce complex video content that is comprised of merged images. While the merged video images can be from any of a great number of sources, such sources specifically include processed pixel data and video signals such as those produced by television signals, DVD players, video tape players, and video recorders. Beneficially, the merged video images form a background having an overlay.

Embodiments of the present invention use fragment shaders to process both multiple video images. In such embodiments, operations can be performed such that the pixels of one video image are processed to form a first video data set (such as for a background image) using multiple programmable texture processing stations. The first video data set is stored, then another video image data is obtained, possibly processed, and passed through one or more texture processing stations to produce a second video data set. Then, the first and second video data sets are merged during a subsequent merge operation that is performed by one or more texture processing stations. The merged first and second video data sets can produce a direct overlay of one set on the other or a blending of the pixel data sets.

Embodiments of the present invention can process background pixels during one pass or set of passes through a texture processing station and then overlay video content on at least some of the fragment shader-processed pixels during another pass through the same texture processing station.

BRIEF DESCRIPTION OF THE DRAWINGS

The foregoing and other aspects and advantages are better understood from the following detailed description of a preferred embodiment of the invention with reference to the drawings, in which:

FIG. 5 illustrates a fragment shader pipeline in more detail;

DETAILED DESCRIPTION

The principles of the present invention provide for a new method of operating fragment shaders to produce complex video content that is comprised of a fragment shader-processed first video data set that is merged another video data set that is produced from one or more video images that may or may not be processed by the fragment shader. Merger may include overlaying a video image or images on the image produced by the first video data set (which may be a background image), or by blending the first video data set and the video image or images together.

Figure 6:
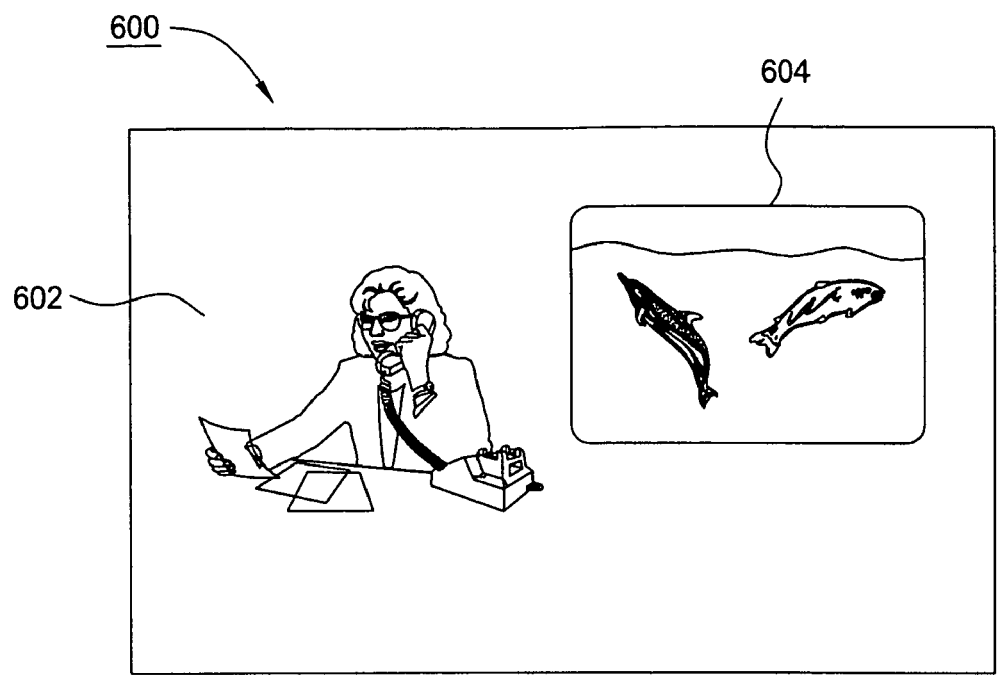
FIG. 6 illustrates a display having a processed background and a video content overlay.

FIG. 6 illustrates an example 600 of a complex video content. That video content is comprised of a fragment shader-processed background 602 over which a video image 604 is impressed. The video image 604 may be from any of any number of sources; including a Digital Versatile Disc (DVD) player, an encoded image sent over the internet, a digitized video program from the internet, a television signal, a digital camera or a digital recorder. What is required is rasterized pixel data set that forms the background 602 and video image data that forms the overlaying video image 604.

Embodiments of the present invention can loop data through a texture engine having multiple fragment shader texture processing stations. The rasterized pixel data set can be processed during one pass or one set of passes to form a first video data set, the first video data set can be stored, a video image can be obtained, possibly processed during a second pass or set of passes through the texture engine and used to produce a second video data set, and then the stored first video data set and the second video data set can be merged the form the complex video content. If multiple video images are being merged together, merged first and second data sets can be produced and stored while a another video image is obtained, possibly processed during a third pass or set of passes through the texture engine to produce a third video data set, and then the stored merged video data sets and the third video data set can be merged to form the complex video content. This process can be repeated as required to produce a desired image.

To better understand the principles of the present invention it may be helpful to understand graphical processing in more detail. Referring back to FIG. 1, the inputs to a fragment shader 110 include two-dimensional display co-ordinates of the vertices of the graphics primitives used in the graphics system. The texture engine 112 has access to data, including background data, programming instructions, and one or more video images, that are stored in the frame buffer memory 120. Typically, but not always, the graphic primitives are triangles while the video image can be from a DVD player 109.

Figure 2A:
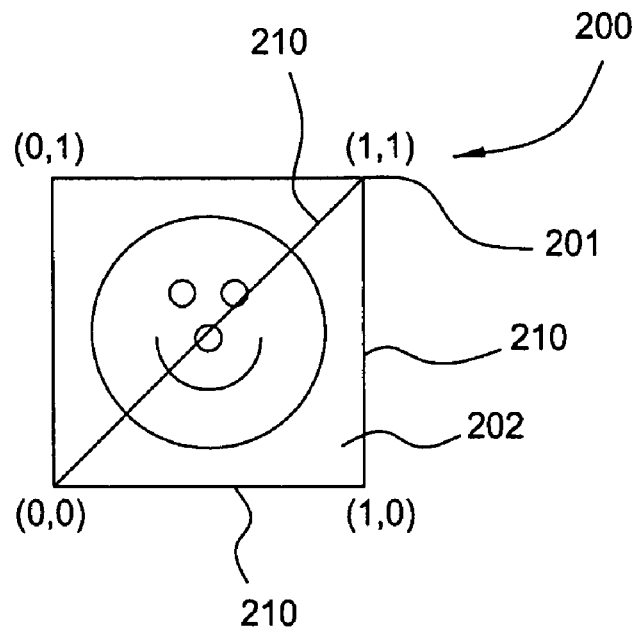
FIG. 2A schematically illustrates a triangle geometric primitive.
Figure 2B:
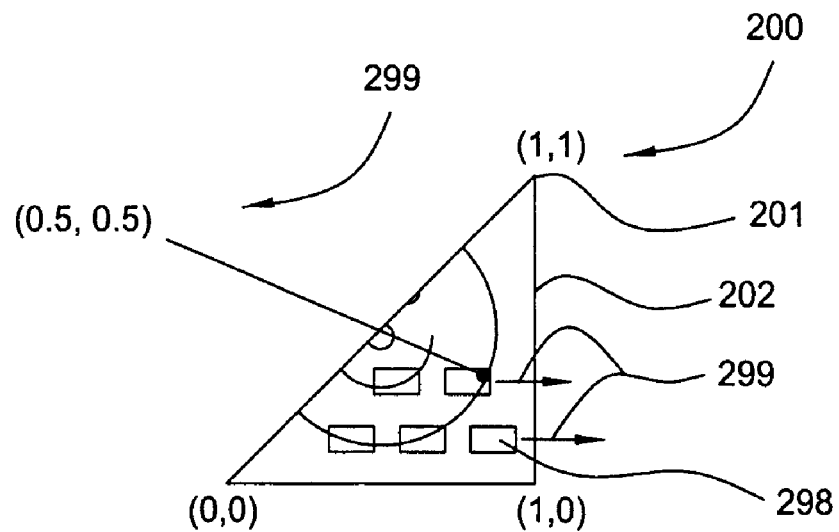
FIG. 2B illustrates a triangle geometric primitive having pixels aligned along each scan line.

FIG. 2A illustrates the coordinates (0,0), (1,0), and (1,1) of the vertices that define a graphic primitive triangle 202. If rectangles are used, the additional coordinate (0,1) would be included in the graphics primitive. However, except for two-dimensional objects such as text, triangles are more common. Once the vertices 201 of the triangle 202 are known, the background pixels within the graphical primitive are determined since they are the pixels located between the lines 210 that form the graphic primitive. Usually the background pixels are organized along raster scan lines. For example, FIG. 2B illustrates a plurality of background pixels 298 within the triangle 202 that are aligned by scan lines 299.

Figure 1:
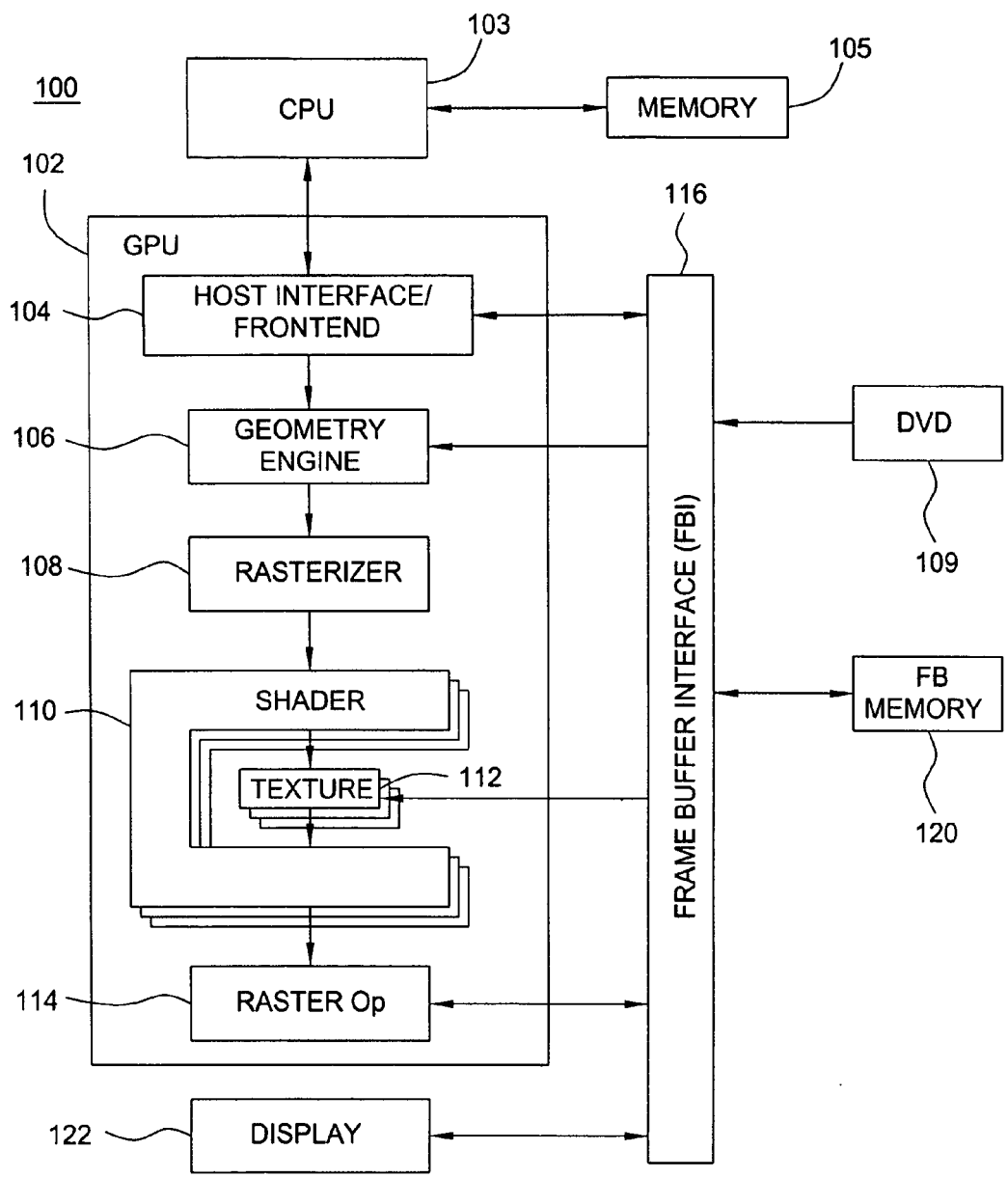
FIG. 1 schematically illustrates a graphics system.
Figure 7:
FIG. 7 illustrates the processed background of FIG. 6.

When shading, multiple images can be impressed on given pixels. For example, all of the pixels of the background 602 of FIG. 6 can be processed such that they would produce the display 700 shown in FIG. 7. Then, the video image 604 can be added to the pixels that comprise the display 700 to produce the display 600. To that end, a digital image source, such as DVD 109 inputs the data of the video image 604 to the frame buffer memory 120 as shown in FIG. 1. It should be noted that, depending on program instructions, the video image 604 can be made to look different by changing the background 602. For example, by making the video image 604 partially transparent during merge operations some of the background 602 can show through the video image 604. In other applications, the video image 604 can totally or almost totally overwrite the background 602 values. Furthermore, multiple video images can be input, with one video image overlapping another and/or the background.

Figure 3:
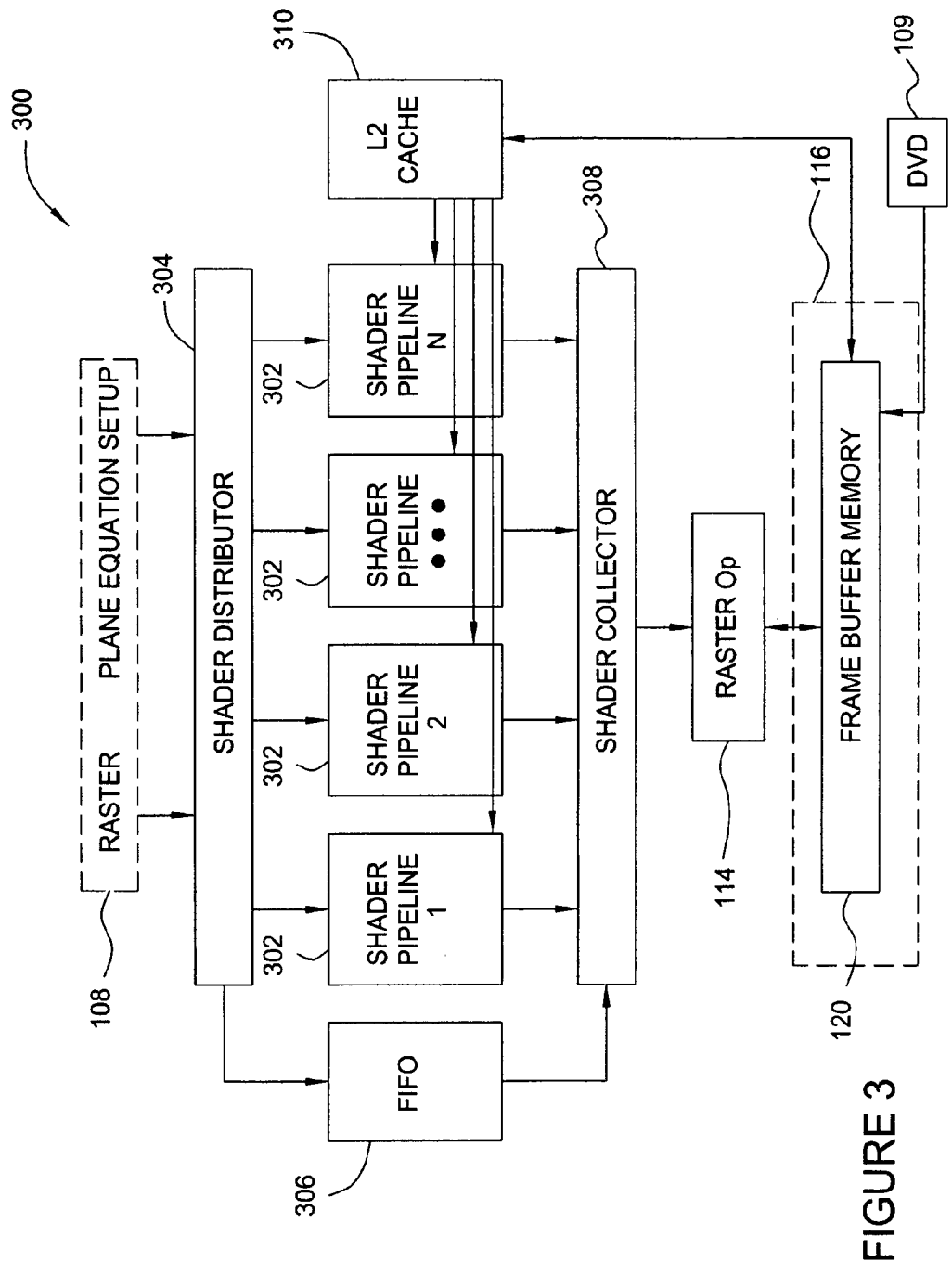
FIG. 3 is a high-level block diagram of a fragment shader architecture having multiple fragment shader pipelines and that is in accord with the principles of the present invention.

FIG. 3 is a high-level block diagram of a fragment shader 300 that can be used to practice the principles of the present invention. The fragment shader 300 converts the rasterized pixel data (which has raw X, Y per fragment and plane equations for per-vertex attributes such as color, depth, texture, coordinates, etc) from the rasterizer 108 into appropriate color and depth values for each pixel that is to be sent to the frame buffer memory 120. Additionally, the fragment shader 300 receives video image data, such as that produced by a DVD player 109. The video image data is merged with the processed pixel data. To do so, the fragment shader 300 executes large numbers of operations to resolve mathematical equations in response to API functions and in response to application program instructions to produce the desired color and depth values to form processed pixel data.

A copy of the application program instructions is typically stored in the frame buffer memory 120. Because there may be numerous application program instructions, and because the fragment shader 300 has limited programmability, the application program instructions are fetched from the frame buffer memory 120 and stored in a cache memory in a manner that is described in more detail subsequently. After additional processing by the Raster Operations Processor, the processed pixel data is converted into frame pixel data that is merged with video image data and then stored by the frame buffer interface 116 in the frame memory 120 (reference FIG. 1).

When processing, the fragment shader 300 performs looping operations as required to process the rasterized pixel data, stores the result, then processes the video image or images as and if required in further passes through a fragment shader pipeline, and then merges the processed pixel data and the processed video image together to form complex video content. Thus, the rasterized pixel data is processed first, then the video image or images, then the results are merged. After further processing by the Raster Operations Processor 114 (see FIG. 1), the merged pixel data is converted into frame pixel data that is stored by the frame buffer interface 116 in the frame memory 120 (reference FIG. 1).

A notable feature of the fragment shader 300 is its multiple fragment shader pipelines 302. Each fragment shader pipeline 302 can be individually programmed to perform mathematical and other processing operations on rasterized pixel data to produce processed pixel data. While the fragment shader 300 is shown as having four fragment shader pipelines 302, there could, in general, be from 1 to N fragment shader pipelines 302, where N is an integer. This scalability can be used to control fragment shader processing power by simply adding/subtracting fragment shader pipelines. Furthermore, such scalability enables fragment shader pipeline 302 redundancies, which, in turn, enables the ability to functionally disable defective fragment shader pipelines 302, while still maintaining the overall operation of the fragment shader 300.

The fragment shader 300 also includes a fragment shader distributor 304 that distributes rasterized pixel data to the various fragment shader pipelines 302. Beneficially distribution is performed in a manner that provides for a balanced workload between the fragment shader pipelines 302. Furthermore, distribution is performed such that rasterized pixel data for the background 602 and the video image are passed through the same fragment shader pipeline 302.

In the fragment shader 300 the rasterized pixel data is distributed in the form of 2×2 pixel arrays called "quads." While the illustrated embodiment fragment shader 300 operates on quads, this is not a requirement of the principles of the present invention. Other fragment shader embodiments may not process groups of pixels together, while other embodiments may use other numbers of pixels in a group, for example, three pixel groups called triads. In general, a pixel grouping can be from 1 to M, where M is an integer. However, in this example quads are used because the fragment shader pipelines 302 are configured to perform one operation on each pixel of a quad for each clock.

The fragment shader 300 also includes a fragment shader distributor 304. One function of the fragment shader distributor 304 is to distribute information from the rasterizer 108 (rasterized pixel data) and the video image or images to the various fragment shader pipelines 302 so that they may process that data in accord with programming instructions. Beneficially this distribution is performed in a manner that provides for a balanced workload between the fragment shader pipelines 302. That is, each fragment shader pipeline 302 performs similar amounts of processing and none is preferred over the others. Another function of the fragment shader distributor 304 is to process the data from the rasterizer 108 such that the fragment shader pipelines 302 only receive what they require.

A portion of control data, referred to as state data, that is not used by the fragment shader pipelines 302 is applied by the fragment shader distributor 304 to a first in/first out buffer memory 306. Besides state data, the first in/first out buffer memory 306 also receives X-Y coordinate and pixel coverage data, which also do not go through the fragment shader pipelines 302.

Because the fragment shader pipelines 302 independently process rasterized pixel data and video image data, the outputs of the fragment shader pipelines 302 have to be organized in such a manner that the resulting processed pixel data is properly matched with the pixels in the frame buffer memory 120 (by raster scan lines). The fragment shader 300 therefore includes a fragment shader collector 308 that receives the outputs of the fragment shader pipelines 302 and the outputs of the first in/first out buffer memory 306, and that organizes the results of the fragment shader operations to produce shaded pixel data for the Raster Operations Processor 114 (ROP).

The output of the fragment shader collector 308 is applied via the frame buffer interface 116 to the frame buffer memory 120. Since the fragment shader pipelines 302 can all request data from the frame buffer memory (through texture requests as described subsequently), the fragment shader 300 includes an L2 cache memory 310 to assist in that process. It is through the texture requests that program instructions can be obtained from the frame buffer memory.

A main function of the fragment shader distributor 304 is to distribute triangle plane equation information, the raster stream information, and the video image or images to the individual fragment shader pipelines 302, beneficially in a manner that balances the fragment shader pipeline workloads between the available fragment shader pipelines 302. Distributing data to the fragment shader pipelines 302 is performed in two phases: segmentation and distribution. Because a fragment shader pipeline 302 can perform operations only on a limited number of pixels at a time, the incoming data is chopped into groups called "segments." Segmentation is the process of forming segments. There are actually multiple reasons to segment, load-balancing being one, and workload size limitations being another. The number of pixels that can be handled by a single fragment shader pipeline 302 is also limited by memory storage capacities of a fragment shader register file (RAM) 444 (shown in FIG. 4) and of the fragment shader gatekeeper 404 itself, as well as the need to send programming instructions down the fragment shader pipelines (as is explained in more detail subsequently).

Distribution is the process of choosing one of the fragment shader pipelines 302 and then feeding that fragment shader pipeline 302 a complete segment, then feeding the next segment to the next fragment shader pipeline 302, and so on. In the fragment shader 300 (see FIG. 3), the segment distribution sequence is a simple round robin assignment between the operable fragment shader pipelines 302. For instance if there are 4 fragment shader pipelines 302 but only three are operable, then the distribution sequence is between the three operable fragment shader pipelines 302. The first segment would go to fragment shader pipeline 0, then to the next segment to fragment shader pipeline 1, then to the next to fragment shader pipelines 2, and then back to fragment shader pipeline 0 and so on.

Figure 4:
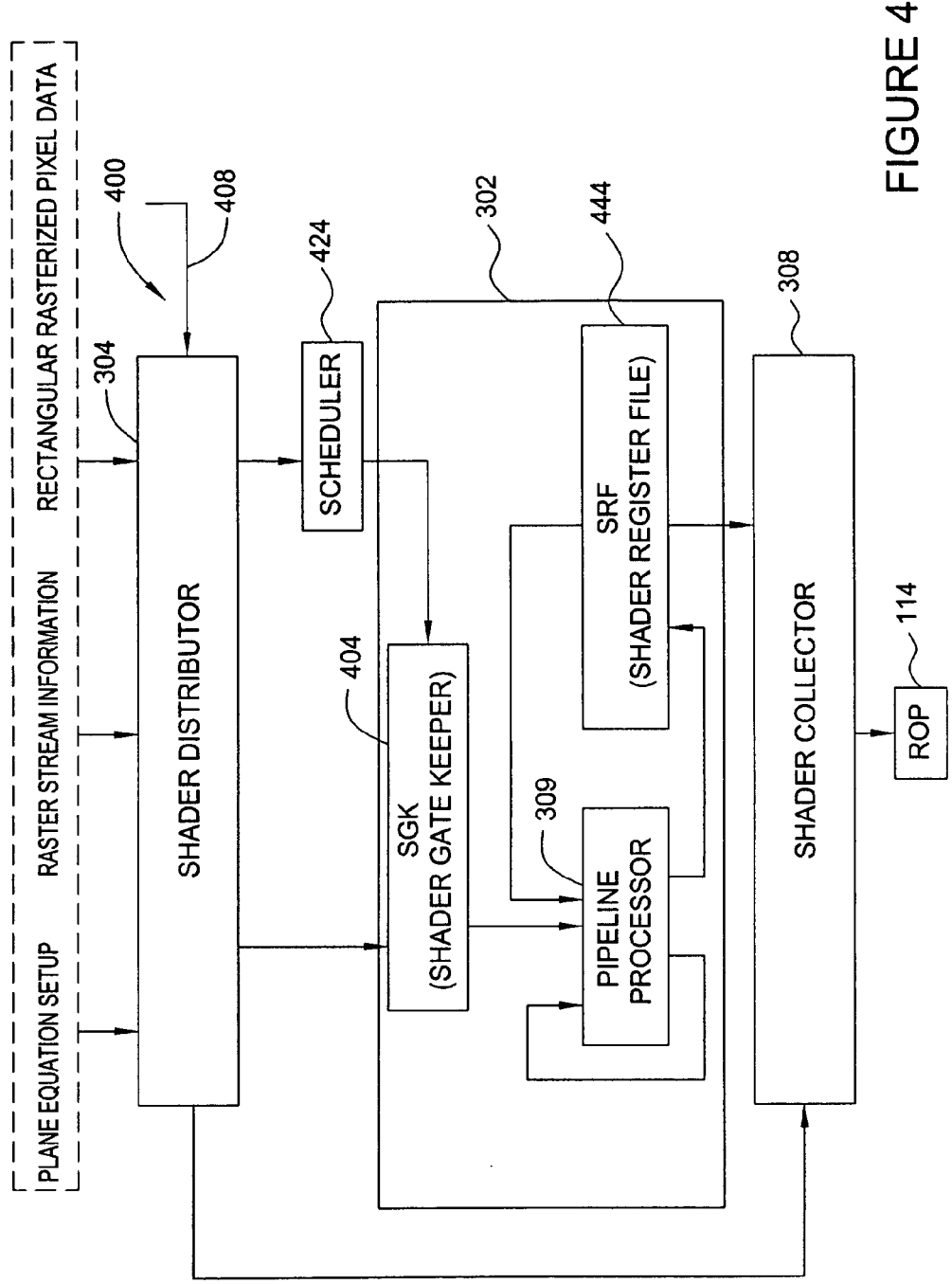
FIG. 4 is a lower-level block diagram of the fragment shader shown in FIG. 3, but with only one (of several) fragment shader pipeline shown.

Turning now to FIG. 4, a fragment shader gatekeeper 404 receives segments (both for the background and video images) from the fragment shader distributor 304. The fragment shader gatekeeper 404 also receives program commands from a scheduler 424, which is described in more detail subsequently. The fragment shader gate keeper 404 passes program commands and incoming segment data to a pipeline processor 309, also described in more detail subsequently, that processes the segment data in line with the program commands. Temporary data storage and output buffering is provided by the fragment shader register file 444. The fragment shader register file 444 stores processed background information while a data for a video image 604 is passing through the pipeline 302. Then, the processed background data is merged with the video image 604 data (which may or may not be processed) to produce complex video content.

After data has been processed, the fragment shader collector 308 collects the processed data from the fragment shader register file 444 of the fragment shader pipeline 302 and combines that data with X, Y, and coverage data from the first in/first out buffer memory 306 (see FIG. 3) to form an organized fragment shader pixel data packet. As noted previously, the result is sent to a Raster Operations Processor 114 that performs additional processing.

In some embodiments of the present invention the fragment shader distributor 304 has functionality related to the initial programming of the first N (say 8) programming instructions. In such embodiments, the initial programming instructions pass through the fragment shader pipeline to the scheduler 424 which then forms program commands for the fragment shader pipeline texture processing stations. After the initial programming, or in embodiments in which the fragment shader distributor 304 does not send initial program instructions, the scheduler 424 obtains the remaining (or all) programming instructions, forms programming commands, and applies them to the fragment shader gatekeepers 404 (one for each fragment shader pipeline 302). Since the scheduler 424 must co-ordinate the application of programming commands with the application of segments to the fragment shader gatekeepers 404, the scheduler 424 is in communication with the fragment shader distributor 304. This is beneficial because in multiple pipeline fragment shaders 300 each pipeline must be individually programmed, which means the scheduler 424 must track which pipeline is running which set of instructions.

Referring now to FIGS. 1 and 3, a copy of all program instructions are beneficially stored in the frame buffer memory 120. To program a fragment shader pipeline 302, the program instructions are applied as fragment programs: small programs that implement subsets of the complete graphical program. Fragment programs are used because the program instructions in the frame buffer memory 120 may not be in the proper format to implement the intended operations, and because a graphical program will usually be too large to be directly applied to a fragment shader pipeline 302 because a fragment shader pipeline 302 has limited resources.

To run a graphics program, fragment programs are formed by sequentially taking N, say 8, of the graphical program instructions at a time, converting them into a corresponding fragment program, and then applying that fragment program as a programming command to a fragment shader pipeline 302. The programming command then programs the fragment shader pipeline texture processing stations. A segment is then input and processed in accord with the fragment program. After the segment has been processed in accord with the first N (8) instructions, another N (8) instructions are obtained, another fragment program if formed, the fragment shader pipeline is re-programmed, and the segment is processed in accord with the new fragment program. The process repeats until a segment has been fully processed in accord with the graphical programming instructions. A program counter tracks the graphical program execution steps.

Figure 5:
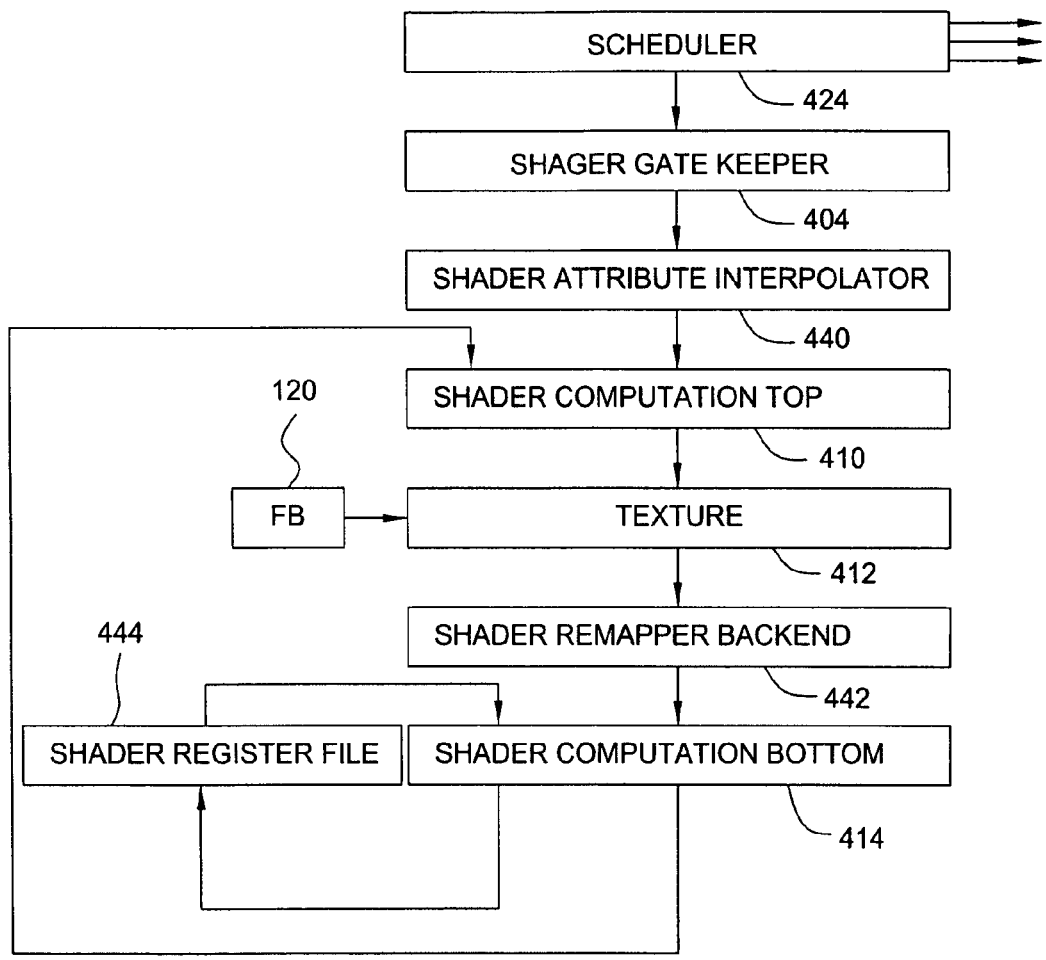
FIG. 5 is a lower-level block diagram of the fragment shader shown in FIGS. 3 and 4, and which illustrates selected architectural features.

Having been provided with an overview of graphical processing (FIG. 1), of the fragment shader architecture (FIG. 3), with detail regarding interactions of main features of the fragment shader 300 (FIG. 4), and with an overview of fragment shader pipeline programming, FIG. 5 will help explain programming and the operations of various texture processing stations within the pipeline processor 309.

Fragment shader pipeline programming is performed using programming commands that take the form of a word, referred to as a very long instruction word, or VLIW. The scheduler 424 forms and sends each pipeline 302 VLIW microcode instructions for each segment pass through the fragment shader pipeline 302. The VLIW is applied to the fragment shader gatekeeper 404, which passes that VLIW to a fragment shader attribute interpolator 440, which passes it on to the various texture processing stations that are described below. The fragment shader attribute interpolator 440 is responsible for producing interpolated attributes, which include texture coordinates, barycentric coefficients, and depth (z or w) to the incoming data. Interpolation in the fragment shader attribute interpolator 440 is done using Sum-of-Products (SOP) arithmetic units.

It should be noted that a given fragment shader pipeline 302 can be programmed with only one fragment program at a time, but that individual pipelines 302 can run different fragment program on different segments.

As noted, the fragment shader pipelines 302 are configured such that a VLIW can program texture processing stations of the pipeline processor 309 to perform various tasks. The various texture processing stations have specific functions that they can be programmed to perform. The ordering of programming functions is the task of a compiler (or interpreter) that compiles (or interprets) a graphical program in accord with the limitations and the organization of the texture processing stations. An incoming VLIW is recognized as a program command, and not a segment, by the use of a program flag bit. An incoming VLIW is parsed by the programmable texture processing stations to isolate the command instructions that control their specific operations.

Referring to FIG. 5, the texture processing stations of a pipeline processor 309 include a fragment shader computation top 410, a texture unit 412 and its fragment shader remapper backend 442, and a fragment shader computation bottom 414. Looping can occur from the fragment shader computation bottom 414 to the fragment shader computation top 410 to enable multiple processing passes through the texture processing stations. The fragment shader register file 444 is in communication with the scheduler 424, and the texture unit 412 is in communication with the frame buffer memory 120. Graphical programming instructions from the frame buffer memory 120 are accessed by the texture unit 412, passed to the fragment shader register file 44 via the fragment shader computation bottom 414, and from there the accessed programming instructions are accessed by the scheduler 424.

Figure 8:
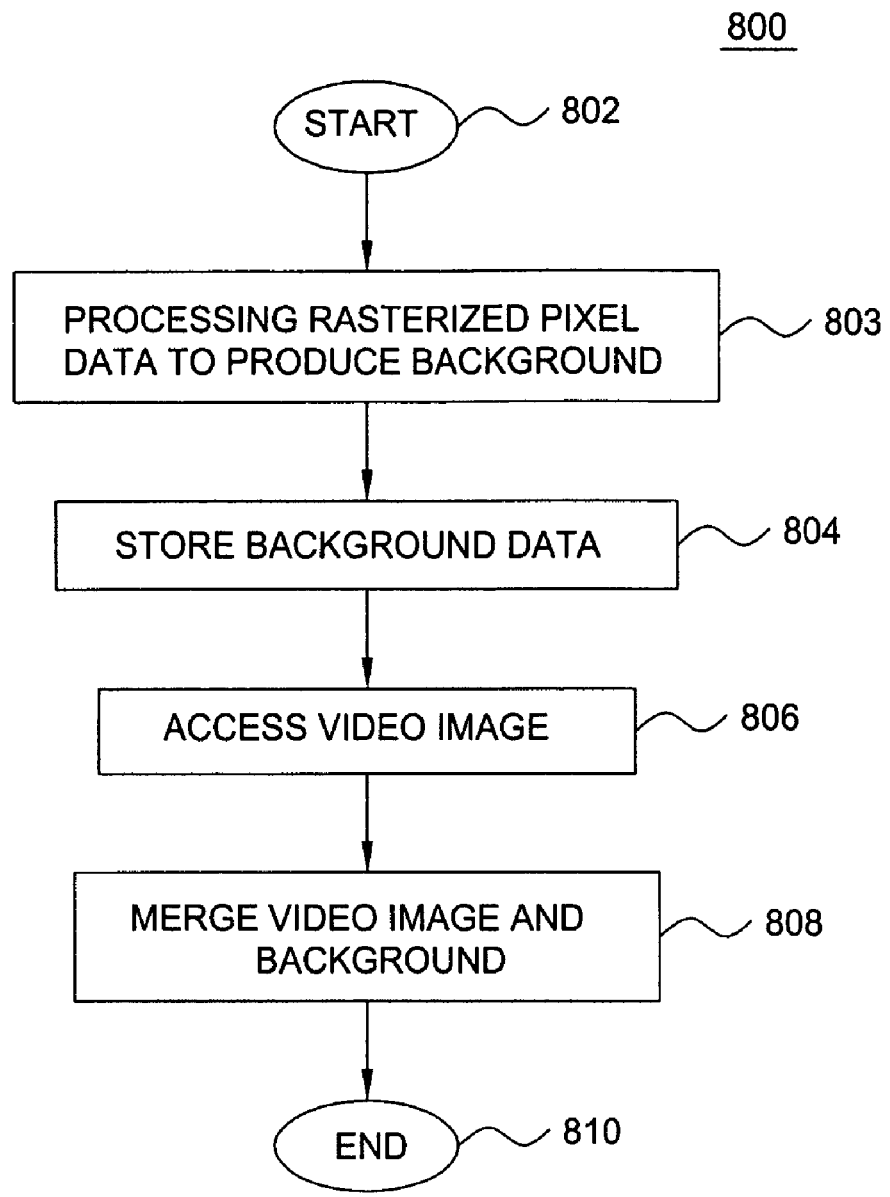
FIG. 8 illustrates a method of operating a fragment shader in accord with the principles of the present invention.

A method 800 of operating a fragment shader to produce complex video content is shown in FIG. 8. The method 800 starts at step 802 and proceeds at step 803 by processing rasterized pixel data to produce the background 602. Then, at step 804 the processed background 602 is stored in the fragment shader register file 444. Then, at step 806 a video image 604 is accessed, and possibly processed. Then, at step 808 the video image and the background processed background data are merged. The method then stops at step 810.

Thus, the method 800 includes receiving and processing background segments in the fragment shader attribute interpolator 440, performing processing operations on the background information using the fragment shader attribute interpolator 440, fragment shader computational top 410, the texture processing station 412 and the fragment shader remapper and Backend 442, and the fragment shader computation bottom 414, looping as required, to complete processing of the background pixels. The results are stored in the fragment shader register file 444. A video image segments is sent through the fragment shader attribute interpolator 440, processed as required using the fragment shader attribute interpolator 440, the fragment shader computational top 410, the texture processing station 412 and the fragment shader remapper and Backend 442, and the fragment shader computation bottom 414, looping as required. Then, merging the -processed background results and the video image together to produce the desired complex video content.

While various embodiments have been described above, it should be understood that they have been presented by way of example only, and not limitation. The foregoing references to specific number, for example the use of quads are for purposes of explanation and illustration only. Thus, the breadth and scope of a preferred embodiment should not be limited by any of the above described exemplary embodiments, but should be defined only in accordance with the following claims and their equivalents.

The invention claimed is:

1. A method of operating a fragment shader that includes a plurality of shader pipelines and a fragment shader distributor for selectively receiving rasterized pixel data and video image data, for selectively processing said rasterized pixel data, and for distributing said processed rasterized pixel data and said video image data to said plurality of shader pipelines, wherein each of the shader pipelines processes selected pixels of a video image to be composited, the method comprising the steps of:

receiving very long instruction words (VLIWs), each VLIW including a plurality of instructions for programming separate processing stations within a shader pipeline and a program flag bit, wherein different shader pipelines within the plurality of shader pipelines are programmed with different VLIWs;

separately programming a first plurality of processing stations within a first of the plurality of shader pipelines based on the plurality of instructions in a first VLIW;

receiving first video pixel data by recalling rasterized video image data from a frame buffer memory;

processing said first video pixel data and said rasterized video image data to produce a first pixel data set that includes said rasterized video image data;

storing the first pixel data set;

programming a second plurality of processing stations within a second of the plurality of shader pipelines based on a second VLIW and the availability of the second shader pipeline;

receiving second video image data;

processing said second video image data to produce a second pixel data set; and merging the first and second pixel data sets to produce a composite video image data set, wherein corresponding pixels of the first and second pixel data sets are processed in a same shader pipeline within the plurality of shader pipelines.

2. The method of claim 1, wherein the step of processing said first video pixel data is performed by passing said first video pixel data through a programmable fragment shader having multiple texture processing stations.

3. The method of claim 2, wherein the step of passing said first video pixel data through the programmable fragment shader includes looping through multiple texture processing stations.

4. The method of claim 3, wherein the step of passing said first video pixel data through the programmable fragment shader includes segmenting rasterized pixel data.

5. The method of claim 1, wherein the step of processing said first video pixel data comprises adding texture information.

6. The method of claim 1, wherein the step of receiving second video image data includes obtaining video image data from a DVD player.

7. The method of claim 1, wherein the step of merging the stored first pixel data set and the second pixel data set together is performed by overlaying the second pixel data set on the stored first pixel data set.

8. The method of claim 1, wherein the step of merging the first and second pixel data sets is performed by blending the first and second pixel data sets together.

9. The method of claim 1, wherein each of the first video pixel data and the second video image data are processed segment by segment, each segment comprising a plurality of pixels.

10. A computer system, comprising:

a central processing unit for running an application program that causes the central processing unit to produce raw graphics data;

a video source for producing a video image;

a frame buffer memory for storing the raw graphics data and the video image; and a graphics processing unit for processing said raw graphics data into pixel data and for merging said pixel data with said video image, said graphics processing unit including:

a host interface for receiving said raw graphics data;

a geometry engine for producing two-dimensional frame-buffer co-ordinates of graphics primitives within said raw graphics data;

a rasterizer that rasterizes said raw graphics data using said two-dimensional frame buffer co-ordinates to produce rasterized pixel data;

a fragment shader having a plurality of fragment shader pipelines that each contain programming processing stations that are programmed with incoming very long instruction words (VLIWs) that each include a program flag bit for processing said rasterized pixel data, different fragment shader pipelines being programmed with different VLIWs that each include a plurality of different instructions for programming the processing stations; and a scheduler for separately and differently programming each of the fragment shader pipelines of said fragment shader, wherein said application program causes said fragment shader to process said rasterized pixel data and to merge said pixel data with said video image, said fragment shader being configured to:

receive a first VLIW that includes a plurality of instructions for programming separate processing stations within a first fragment shader pipeline and including a program flag bit;

program a plurality of processing stations within the first fragment shader pipeline based on the plurality of instructions in the first VLIW;

receive first video pixel data by recalling rasterized video image data from a frame buffer memory;

process said first video pixel data and said rasterized video image data to produce a first pixel data set that includes said rasterized video image data;

store the first pixel data set;

receive a second VLIW that includes a plurality of instructions for programming separate processing stations within a second fragment shader pipeline and including a program flag bit;

program a second plurality of processing stations within the second shader pipeline based on the second VLIW and the availability of the second shader pipeline;

receive second video image data;

process said second video image data to produce a second pixel data set; and merge the first and second pixel data sets to produce a composite video image data set, wherein corresponding pixels of the first and second pixel data sets are processed in a same fragment shader Pipeline within the plurality of fragment shader pipelines.

11. The computer system of claim 10, wherein each of the video pixel data and video image data are processed segment by segment, each segment comprising a plurality of pixels.

12. A graphics processing integrated circuit, comprising:
a front end for receiving raw graphics data and video image data;
a geometry engine for organizing said raw graphics data into geometric primitives;
a rasterizer for converting said geometric primitives into rasterized pixel data; and
a fragment shader for processing said rasterized pixel data to produce pixel data and for merging said pixel data and said video image data together, said fragment shader including:
  a plurality of fragment shader pipelines that each contain programmable processing stations that are programmed with incoming very long instruction words (VLIW)s that each include a program flag bit, each of the fragment shader pipelines for processing said rasterized pixel data to form said background pixel data and for merging said pixel data and said video image data together; and
a fragment shader distributor for selectively receiving rasterized pixel data and video image data, for selectively processing said rasterized pixel data, and for distributing said processed rasterized pixel data and said video image data to said plurality of fragment shader pipelines, wherein said fragment shader includes a scheduler for applying the very long instruction words (VLIWs) that each comprise a plurality of instructions to said plurality of fragment shader pipelines, wherein different ones of VLIWs are applied to different ones of the fragment shader pipelines and said program commands control the processing of said rasterized pixel data and the merging of said pixel data and said video image data together, said fragment shader being configured to:
  receive a first VLIW that includes a plurality of instructions for programming separate processing stations within a first one of the fragment shader pipelines and including a program flag bit;
  program a plurality of processing stations within the first fragment shader pipeline based on the plurality of instructions in the first VLIW;
  receive first video pixel data by recalling rasterized video image data from a frame buffer memory;
  process said first video pixel data and said rasterized video image data to produce a first pixel data set that includes said rasterized video image data;
  store the first pixel data set;
  receive a second different VLIW that includes a plurality of instructions for programming separate processing stations within a second one of the fragment shader pipelines and including a program flag bit;
  program a second plurality of processing stations within the second fragment shader pipeline based on the second VLIW and the availability of the second shader pipeline;
  receive second video image data;
  process said second video image data to produce a second pixel data set; and
  merge the first and second pixel data sets to produce a composite video image data set, corresponding pixels of the first and second pixel data sets are processed in a same fragment shader pipeline within the plurality of fragment shader pipelines.

13. The graphics processing integrated circuit of claim 12, wherein said rasterized pixel data is divided into segments, each of the segments being able to fit into one or more of the fragment shader pipelines without loss of said rasterized pixel data.

14. The graphics processing integrated circuit of claim 12, wherein at least one of the fragment shader pipelines shades processed rasterized pixel data to add texture information.

* * * * *